United States Patent
Ozawa (10) Patent No.: US 11,526,419 B2
(45) Date of Patent: Dec. 13, 2022

(54) INFORMATION PROCESSING SYSTEM AND INFORMATION PROCESSING METHOD

(71) Applicant: Canon Kabushiki Kaisha, Tokyo (JP)

(72) Inventor: Wataru Ozawa, Oita (JP)

(73) Assignee: Canon Kabushiki Kaisha, Tokyo (JP)

( * ) Notice: Subject to any disclaimer, the term of this patent is extended or adjusted under 35 U.S.C. 154(b) by 41 days.

(21) Appl. No.: 17/123,418

(22) Filed: Dec. 16, 2020

(65) Prior Publication Data

US 2021/0191839 A1  Jun. 24, 2021

(30) Foreign Application Priority Data

Dec. 19, 2019 (JP) .............................. JP2019-229476

(51) Int. Cl.
*G06F 11/00* (2006.01)
*G06F 11/34* (2006.01)
*G06F 11/30* (2006.01)

(52) U.S. Cl.
CPC ...... *G06F 11/3476* (2013.01); *G06F 11/3013* (2013.01); *G06F 11/3419* (2013.01)

(58) Field of Classification Search
CPC .......................... G06F 11/3476; G06F 11/3419
See application file for complete search history.

(56) References Cited

U.S. PATENT DOCUMENTS

| 11,188,508 B1* | 11/2021 | Wang ................... G06F 16/2228 |
| 2013/0227352 A1* | 8/2013 | Kumarasamy ...... G06F 11/3006 |
| | | 714/47.1 |
| 2021/0019323 A1* | 1/2021 | Wakitani ............. G06F 16/2308 |

FOREIGN PATENT DOCUMENTS

JP    201614980 A    1/2016

* cited by examiner

*Primary Examiner* — Charles Ehne
(74) *Attorney, Agent, or Firm* — Venable LLP

(57) ABSTRACT

An information processing system that extracts a specified piece of log data or a specified field that constitutes the specified piece of log data, from a log file in which pieces of log data having different recording formats are mixed, the information processing system includes a format-information recording portion configured to store format information in which a determination condition to identify a recording format of the specified piece of log data is contained, an extraction-condition recording portion configured to store an extraction condition to extract the specified piece of log data or the specified field, and an extraction processing portion configured to extract the specified piece of log data or the specified field, from the log file by using the format information stored in the format-information recording portion and the extraction condition.

16 Claims, 10 Drawing Sheets

| MULTIPLE-FORMAT INFORMATION | | | FIELD INFORMATION | | | | | | | | | | | FORMAT DETERMINATION CONDITION |
|---|---|---|---|---|---|---|---|---|---|---|---|---|---|---|
| LOG FILE NAME | FORMAT NAME | DELI-MITER | DATA 1 | DATA 2 | DATA 3 | DATA 4 | DATA 5 | DATA 6 | DATA 7 | DATA 8 | DATA 9 | DATA 10 | DATA 11 | |
| /var/log/ st1_daily_robot_log | C1 ARM LOG | , | DATE | TIME | CONTROLLER NUMBER | ROBOT TYPE | X-COORDINATE | Y-COORDINATE | Z-COORDINATE | X-DIRECTION ANGLE | Y-DIRECTION ANGLE | Z-DIRECTION ANGLE | | DATA3="C1" AND DATA4="SIX-AXIS ARM" |
| | C2 HAND LOG | , | DATE | TIME | CONTROLLER NUMBER | ROBOT TYPE | ONE-AXIS PULSE VALUE | X-DIRECTION FORCE SENSOR | Y-DIRECTION FORCE SENSOR | Z-DIRECTION FORCE SENSOR | | | | DATA3="C2" AND DATA4="ONE-AXIS HAND" |
| | C3 ARM LOG | , | DATE | TIME | CONTROLLER NUMBER | ROBOT TYPE | X-COORDINATE | Y-COORDINATE | Z-COORDINATE | X-DIRECTION ANGLE | Y-DIRECTION ANGLE | Z-DIRECTION ANGLE | Z-DIRECTION FORCE SENSOR | DATA3="C3" AND DATA4="SIX-AXIS ARM" |
| /var/log/ st2_daily_robot_log | C4 HAND LOG | , | DATE | TIME | CONTROLLER NUMBER | ROBOT TYPE | ONE-AXIS PULSE VALUE | TWO-AXIS PULSE VALUE | X-DIRECTION FORCE SENSOR | Y-DIRECTION FORCE SENSOR | Z-DIRECTION FORCE SENSOR | | | DATA3="C4" AND DATA4="TWO-AXIS HAND" |
| | C5 ARM LOG | , | DATE | TIME | CONTROLLER NUMBER | ROBOT TYPE | X-COORDINATE | Y-COORDINATE | Z-COORDINATE | X-DIRECTION ANGLE | Y-DIRECTION ANGLE | Z-DIRECTION ANGLE | MOTOR TEMPERATURE | DATA3="C5" AND DATA4="SIX-AXIS ARM" |
| | C6 HAND LOG | , | DATE | TIME | CONTROLLER NUMBER | ROBOT TYPE | X-DIRECTION FORCE SENSOR | Y-DIRECTION FORCE SENSOR | Z-DIRECTION FORCE SENSOR | ONE-AXIS PULSE VALUE | TOW-AXIS PULSE VALUE | | | DATA3="C6" AND DATA4="TWO-AXIS HAND" |
| ... | ... | | | | | | | | | ... | | | | ... |

MULTIPLE-EXTRACTION-CONDITION INFORMATION

| LOG FILE NAME | ANALYSIS TARGET PERIOD (DATE, TIME) | FORMAT NAME | EXTRACTION ITEM |
|---|---|---|---|
| /var/log/ st1_daily_robot_log | 2017/01/01, 12:00:00 - 2017/01/01, 12:10:00 | C1 ARM LOG | DATE, TIME, CONTROLLER NUMBER, ROBOT TYPE, COMMAND TYPE, X-COORDINATE, Y-COORDINATE, Z-COORDINATE |
| | | C2 HAND LOG | DATE, TIME, CONTROLLER NUMBER, Z-AXIS FORCE SENSOR VALUE |
| | | C3 ARM LOG | DATE, TIME, CONTROLLER NUMBER, ROBOT TYPE, COMMAND TYPE, X-COORDINATE, Y-COORDINATE, Z-DIRECTION FORCE SENSOR |
| | | C4 HAND LOG | DATE, TIME, CONTROLLER NUMBER, Z-AXIS FORCE SENSOR VALUE |
| /var/log/ st2_daily_robot_log | 2017/01/02, 12:00:00 - 2017/01/02, 12:10:00 | C5 ARM LOG | DATE, TIME, CONTROLLER NUMBER, ROBOT TYPE, COMMAND TYPE, X-COORDINATE, Y-COORDINATE, Z-COORDINATE, MOTOR TEMPERATURE |
| | | C6 HAND LOG | DATE, TIME, CONTROLLER NUMBER, ONE-AXIS PULSE VALUE, TWO-AXIS PULSE VALUE |
| ... | ... | ... | ... |

901: RECORD

| 2017/07/21, 13:30:16.8, C1, SIX-AXIS ARM, MOVE, x=119, y=-81, z= 298, tX= -180, tY=0, tZ=-90, |

900

LOG FILE NAME : st1_daily_robot_log

2017/07/21, 13:30:16.8, C1, SIX-AXIS ARM, MOVE, x=119, y=-81, z=298, tX=-180, tY=0, tZ=-90,
2017/07/21, 13:30:16.8, C2, ONE-AXIS HAND, OPEN AND CLOSE, J1PULSE=10000, FORCEX=10, FORCEY=10, FORCEZ=10,
2017/07/21, 13:30:16.8, C3, SIX-AXIS ARM, MOVE, x=60, y=-40, z=150, tX=90, tY=0, tZ=180, FORCE=20,
2017/07/21, 13:30:16.8, C4, TWO-AXIS HAND, OPEN AND CLOSE, J1PULSE=20000, J2PULSE=10000, FORCEX=20, FORCEY=20, FORCEZ=20,
. . .

FIG.10

INFORMATION PROCESSING SYSTEM AND INFORMATION PROCESSING METHOD

BACKGROUND OF THE INVENTION

Field of the Invention

The present invention relates to an information processing system and an information processing method that extract a specified piece of log data or a specified field that constitutes the specified piece of log data, from a log file in which pieces of log data having different recording formats are mixed.

Description of the Related Art

In operating and maintaining a system such as a production apparatus including a robot arm, a person in charge of the maintenance sometimes analyzes log data that constitutes a log, for a request from an end user or an investigation conducted for various purposes. In general, the log is a record in which the text data that represents operation conditions is associated with time information and recorded by an OS kernel, a service, an application, or the like that is running on the system.

Such a log is analyzed, for example, for identifying a cause of trouble of a production apparatus. Thus, in the log analysis, an OS operation history, a work history, an operation history, an error occurrence history, and the like may be studied. For example, Japanese Patent Application Publication No. 2016-14980 proposes a technique for trouble analysis, for reducing labor and time for a log analysis operation that involves reading a log and extracting log data.

Japanese Patent Application Publication No. 2016-14980 determines the type of an OS log or an application log, which has been read for analysis, from a log file name. That is, Japanese Patent Application Publication No. 2016-14980 identifies a log type from a log file name; recognizes fields of the log, depending on format information predefined for each log type; and extracts only necessary fields, depending on extraction conditions that are set by a user.

As described above, Japanese Patent Application Publication No. 2016-14980 identifies a log type from a log file name. However, there is a case where a log server merges logs created by different applications, OSes, production-apparatus controllers, and the like and having different formats, into a single log file. If such a log file in which different formats are mixed is used, the format determination based on the log type cannot be used.

SUMMARY OF THE INVENTION

According to a first aspect of the present invention, an information processing system that extracts a specified piece of log data or a specified field that constitutes the specified piece of log data, from a log file in which pieces of log data having different recording formats are mixed, the information processing system includes a format-information recording portion configured to store format information in which a determination condition to identify a recording format of the specified piece of log data is contained, an extraction-condition recording portion configured to store an extraction condition to extract the specified piece of log data or the specified field that constitutes the specified piece of log data, and an extraction processing portion configured to extract the specified piece of log data or the specified field that constitutes the specified piece of log data, from the log file by using the format information stored in the format-information recording portion and the extraction condition stored in the extraction-condition recording portion.

According to a second aspect of the present invention, an information processing method that extracts a specified piece of log data or a specified field that constitutes the specified piece of log data, from a log file in which pieces of log data having different recording formats are mixed, the information processing method includes preparing, by a control device, format information in which a determination condition to identify a recording format of the specified piece of log data is contained, preparing, by the control device, an extraction condition to extract the specified piece of log data or the specified field that constitutes the specified piece of log data, and extracting, by the control device, the specified piece of log data or the field that constitutes the specified piece of log data, from the log file by using the format information and the extraction condition.

Further features of the present invention will become apparent from the following description of exemplary embodiments with reference to the attached drawings.

DESCRIPTION OF THE EMBODIMENTS

Hereinafter, an embodiment of the present invention will be described with reference to the accompanying drawings. Note that since a configuration described below is merely one example, detailed configurations thereof may be modified as appropriate by a person skilled in the art without departing the spirit of the present invention. In addition, numerical values of the present embodiment are merely reference examples.

Figure 1:
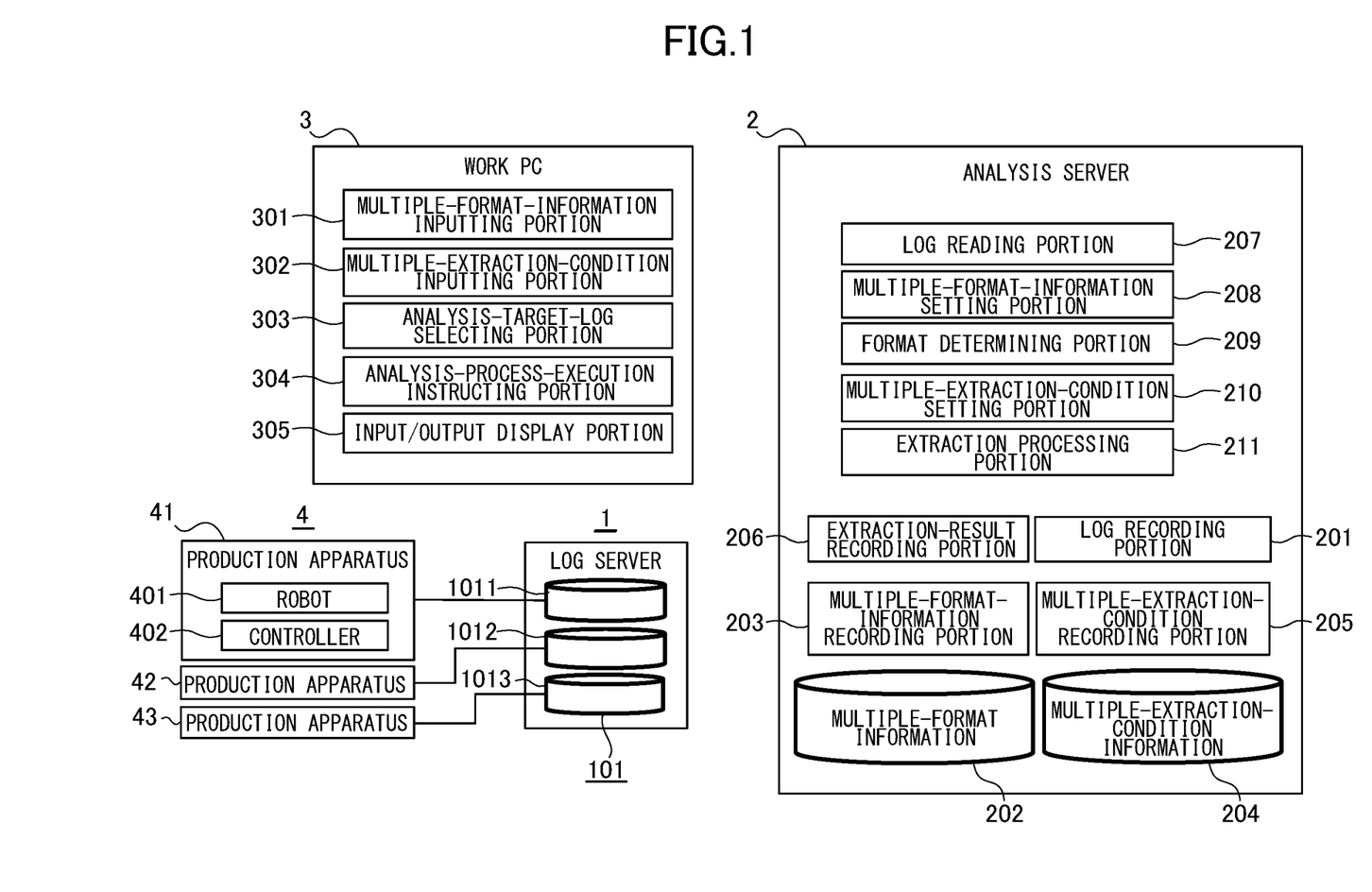
FIG. 1 is a block diagram illustrating a system configuration of a first embodiment of the present invention.

In the present embodiment, an information processing system that performs log analysis will be described. The information processing system is used in an emergency supervisory system or a production control system for a production line that uses robots. FIG. 1 illustrates a functional block configuration of a system and devices to which the present invention can be applied.

The system of the present embodiment includes a production apparatus 4 and three control devices: a log server 1, an analysis server 2, and a work PC 3. The production apparatus 4 is an apparatus on which the emergency supervision or the production control is performed. The control devices constitute the emergency supervisory system or the production control system. Each of the log server 1, the analysis server 2, and the work PC (work terminal) 3 may be a personal computer (PC) whose control device is a later-described CPU. Note that although the control devices, which constitute the emergency supervisory system or the production control system, are the separate three components (i.e. the log server 1, the analysis server 2, and the work PC 3) in the present embodiment, any two or three of the three components may be formed as an integrated control device.

Figure 10:
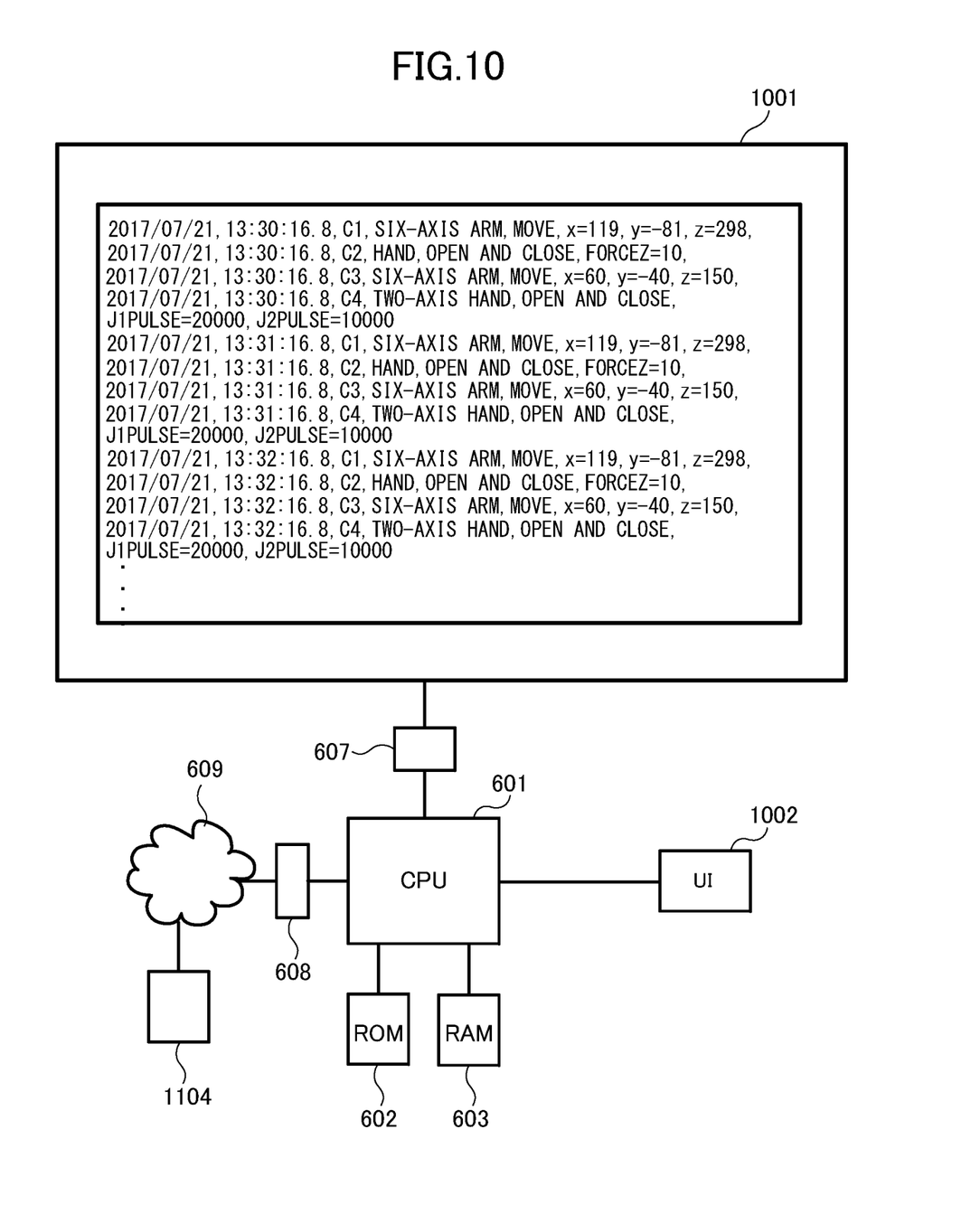
FIG. 10 is a diagram illustrating a hardware configuration of the first embodiment of the present invention and one example of an analysis-result display screen.

FIG. 10 illustrates a configuration of a control system of the work PC 3 that includes a display 1001. Note that the configuration of the control system, illustrated in a lower portion of FIG. 10 and including a CPU 601 as a main component, is the same as that of the log server 1 and the analysis server 2. The control system as illustrated in FIG. 10 may be achieved by using a PC.

The control system illustrated in FIG. 10 may be achieved by hardware of a PC that includes a CPU 601, a ROM 602, and a RAM 603. The CPU 601 is a main control unit, and the ROM 602 is a storage device. The ROM 602 stores a control program and information on constants, used by the CPU 601 that achieves procedures of log analysis and extraction in the present embodiment. The RAM 603 is used as a work area of the CPU 601 when the control procedures are executed. In addition, the control system illustrated in FIG. 10 is connected with an external storage device (not illustrated). The external storage device may be an HDD, an SSD, or an external storage device of another network-mounted system.

The control program of the CPU 601 to achieve the procedures of log analysis and extraction in the present embodiment is stored in a storage portion, such as EEPROM area of the above-described external storage device or the ROM 602. In this case, the control program of the CPU 601 to achieve the control procedures of log analysis and extraction in the present embodiment can be supplied to the above-described storage portion via a network interface 608, and updated to a new (different) program. In another case, the control program of the CPU 601 to achieve later-described control procedures can be supplied to the storage portion via a storage unit, such as a magnetic disk, an optical disk, or a flash memory, and a corresponding drive device; and the contents of the control program can be updated. The storage unit, the storage portion, or the storage device that stores the control program of the CPU 601 to achieve the control procedures of the present embodiment is a computer-readable recording medium.

A network interface 608 can be achieved by using wire-communication standards such as IEEE 802.3, or wireless-communication standards such as IEEE 802.11 or 802.15. The CPU 601 can communicate with other devices 1104 via the network interface 608 and a network 609. If the device of FIG. 10 is the work PC 3, the other devices 1104 are the log server 1 and the analysis server 2. These three control devices can communicate with each other via the network 609.

In addition, the control device illustrated in FIG. 10 also includes a user interface device (UI device) 1002. The user interface device 1002 may be a GUI device including an LCD display, a keyboard, and a pointing device (such as a mouse or a joy stick). Via the user interface device 1002, later-described multiple-format information 202 and multiple-extraction-condition information 204 can be inputted and set.

Referring back to FIG. 1, the log server 1 has a log 101. In this example, the log 101 is constituted by three log files, each of which is illustrated by using a symbol of HDD or the like. The three log files, which constitute the log 101, correspond to three production apparatuses 41, 42, and 43 that constitute the production apparatus 4. In addition, each of the log files stores log data related to operation conditions of a corresponding production apparatus.

Each of the production apparatuses 41 to 43 includes a robot 401 and a controller 402 that controls the robot 401. The robot 401 includes a robot arm and a hand that handles a workpiece. The controller 402 controls the robot arm and the hand for causing the robot arm and the hand to handle the workpiece. The controller 402 serves control units for controlling the robot arm and the hand. In the following description, the control units may be individually described.

The analysis server 2 includes a log recording portion 201, a multiple-format-information recording portion 203, a multiple-extraction-condition recording portion 205, and an extraction-result recording portion 206. In addition, the analysis server 2 also includes a log reading portion 207, a multiple-format-information setting portion 208, a format determining portion 209, a multiple-extraction-condition setting portion 210, and an extraction processing portion 211. Among the above-described components, each processing portion may be achieved by the CPU 601 that executes a control program in which later-described control procedures are written; each recording portion may be achieved by a storage unit, such as the previously-described ROM 602 or the RAM 603.

The multiple-format-information recording portion 203 may be achieved by a storage area of a memory (such as the previously-described ROM 602 or the RAM 603). The multiple-format-information recording portion 203 stores multiple-format information 202. The multiple-format information 202 is used to control the extraction (or search) of log data. In addition, the multiple-extraction-condition recording portion 205 may be achieved by a storage area of a memory (such as the RAM 603). The multiple-extraction-condition recording portion 205 stores multiple-extraction-condition information 204. The multiple-extraction-condition information 204 is also used to control the extraction (or search) of log data.

The work PC 3 includes a multiple-format-information inputting portion 301, a multiple-extraction-condition inputting portion 302, an analysis-target-log selecting portion 303, an analysis-process-execution instructing portion 304, and an input/output display portion 305. These inputting portion, the selecting portion, the instructing portion, and the display portion are achieved by user interfaces that use hardware, such as a display, a keyboard, and a pointing device (see FIG. 10 described later).

Log Server

The log server 1 stores the log 101 (1011 to 1013) outputted by the controllers 402, for identifying a cause of trouble of the production apparatus 4. Each of the controllers 402 controls a corresponding robot 401 that operates in a corresponding one of the production apparatuses 41 to 43. Log data recorded in the log 101 contains a robot motion log and an error-occurrence history log of the production apparatus 4. The robot motion log contains information on the type of motion of the arm, an instructed pulse value sent to a motor of each shaft of the robot arm, a feedback pulse value obtained from an encoder, three-dimensional coordinates of the robot hand, a force sensor value, and the amount of opening and closing of fingers of the robot hand.

Each of the production apparatuses 41 to 43 has the robot 401 operating in the corresponding apparatus. The log server 1 has the logs 1011 to 1013 stored for respective production apparatuses 41 to 43. In the present embodiment, while these log files are used, different types of robots 401 may be disposed in the single production apparatus 4. As a result, pieces of log data having different formats may be recorded in the logs 1011 to 1013. Furthermore, the arm and the hand of a robot may be made by different makers (vendors). In this case, the formats of log data from the arm and the hand may be different from each other. Note that the phrase "formats are different" involves a case where a plurality of files has different extensions, and a case where a plurality of files has different numbers of pieces of data even though the plurality of files has an identical extension.

In the present embodiment, the plurality of robots 401 is disposed in the production apparatus 4, and pieces of log data having different formats are outputted from the robots 401. In some cases, pieces of log data having different formats are outputted from the arm and the hand of each robot. The log server 1 merges the log files, in which various formats are mixed, into a single file in the order of the production apparatuses 41 to 43, or in the order of receipt time, and outputs the single log file. For performing the trouble analysis of the production apparatus 4 that controls the robots 401, the order of operations of the robots 401 and the contents of operations of the robots 401 are important. Thus, a time stamp generated by the controller 402 that controls the robot 401 is recorded as log data. The logging (i.e. recording of log data) is performed in the above-described manner. Since the log data is recorded in the order of receipt time at which the server receives the log data, there is no contradiction in time series even when one piece of log data is slightly shifted from another.

For the above-described recording of log (logging), the syslog protocol/server may be used. For example, the log server 1 serves as a syslog server. The syslog server receives log data from the production apparatuses 41 to 43 via the network 609 (FIG. 10) and the syslog protocol, and stores the log data in the logs 1011 to 1013 in the order of receipt time.

Analysis Server

The analysis server 2 includes the log recording portion 201, the multiple-format-information recording portion 203, the multiple-extraction-condition recording portion 205, and the extraction-result recording portion 206. In addition, the analysis server 2 also includes the log reading portion 207, the multiple-format-information setting portion 208, the format determining portion 209, the multiple-extraction-condition setting portion 210, and the extraction processing portion 211.

The log recording portion 201 stores a log file that contains an analysis target log among the log files (logs 1011 to 1013) stored in the log server 1. For sending the log file from the log server 1 to the analysis server 2, the ftp protocol, the sftp protocol, the http protocol, or the https protocol can be used, as well as the syslog protocol.

Note that although the analysis server 2 and the log server 1 are separate devices in the present embodiment, the analysis server 2 and the log server 1 may be an integrated control device. In this case, the analysis server 2 receives log data from each of the production apparatuses 41 to 43 via the syslog protocol or the like. In addition, the log recording portion 201 may be achieved by an HDD or the like that stores the log files (logs 1011 to 1013).

The multiple-format-information recording portion 203 stores the multiple-format information 202. In the multiple-format information 202, a plurality of log formats and format determination conditions are recorded for each type of log files. The multiple-extraction-condition recording portion 205 stores the multiple-extraction-condition information 204. In the multiple-extraction-condition information 204, multiple extraction conditions used in the extracting process are recorded for each of log formats of an analysis-target log file. The extraction-result recording portion 206 stores data extracted by the extraction processing portion 211 and required for analysis. The log reading portion 207 reads an analysis-target log file stored in the log recording portion 201, and develops the data of the log file in a memory. The multiple-format-information setting portion 208 reads the multiple-format information 202 corresponding to the type of an analysis-target log file, from the multiple-format-information recording portion 203; and sets the multiple-format information 202.

The format determining portion 209 determines that each log of a log file stored in the log reading portion 207 has which format of a plurality of formats that are set in the multiple-format-information setting portion 208.

The multiple-extraction-condition setting portion 210 reads the multiple-extraction-condition information 204 corresponding to the type of an analysis-target log file, from the multiple-extraction-condition recording portion 205; and sets the multiple-extraction-condition information 204. The multiple-extraction-condition setting portion 210 identifies, from the multiple-extraction-condition information 204 having been read, extraction conditions corresponding to a log format determined by the format determining portion 209; and determines data fields to be extracted from each log of the analysis target file.

The extraction processing portion 211 performs the extracting process on a log, depending on extraction conditions that are set in the multiple-extraction-condition setting portion 210. Extracted resultant data is stored in the extraction-result recording portion 206. The extracted resultant data stored in the extraction-result recording portion 206 can be sent to and outputted by the display 1001 (FIG. 10) or a printer. Thus, a user can monitor the operation condition of the production apparatus 4, or can conduct a production control operation by using the extracted resultant data, which has satisfied the specified extraction conditions and is outputted.

Work PC

The work PC 3 includes the multiple-format-information inputting portion 301, the multiple-extraction-condition inputting portion 302, the analysis-target-log selecting portion 303, the analysis-process-execution instructing portion 304, and the input/output display portion 305. Note that although the work PC 3 and the analysis server 2 are separate devices in FIG. 1, the work PC 3 and the analysis server 2 may be an integrated control device. In another case, the functions of the work PC 3 may be implemented in the log server 1.

An analysis operator (user) causes the multiple-format-information inputting portion 301 to input the multiple-format information 202 into the multiple-format-information recording portion 203 of the analysis server 2 for each of analysis-target log files. Note that the multiple-format information 202 may not necessarily be inputted manually by a user. For example, the multiple-format information 202 may be inputted by reading file information on a database file or the like (i.e. file data itself, a file name, or a pointer to the database file).

The analysis operator causes the multiple-extraction-condition inputting portion 302 to input the multiple-extraction-condition information 204 into the multiple-extraction-condition recording portion 205 of the analysis server 2 for each of analysis-target log files and for each of formats.

The analysis operator causes the analysis-target-log selecting portion 303 to select a log file used for trouble analysis. That is, the operator specifies an analysis-target log file name by using the analysis-target-log selecting portion 303.

The analysis-process-execution instructing portion 304 instructs the analysis server 2 to extract information necessary for the analysis, from a log, depending on the information inputted or selected by the user by using the multiple-format-information inputting portion 301, the multiple-extraction-condition inputting portion 302, and the analysis-target-log selecting portion 303.

The input/output display portion 305 displays a screen used for the analysis operator to input the information by using the multiple-format-information inputting portion 301, the multiple-extraction-condition inputting portion 302, and the analysis-target-log selecting portion 303, and a screen used for displaying an analysis result.

Hereinafter, with reference to FIGS. 1 to 10, the log extraction and the analysis system of the present embodiment will be described. In particular, processing procedures performed by the analysis server will be described in detail.

Main Process

Figure 2:
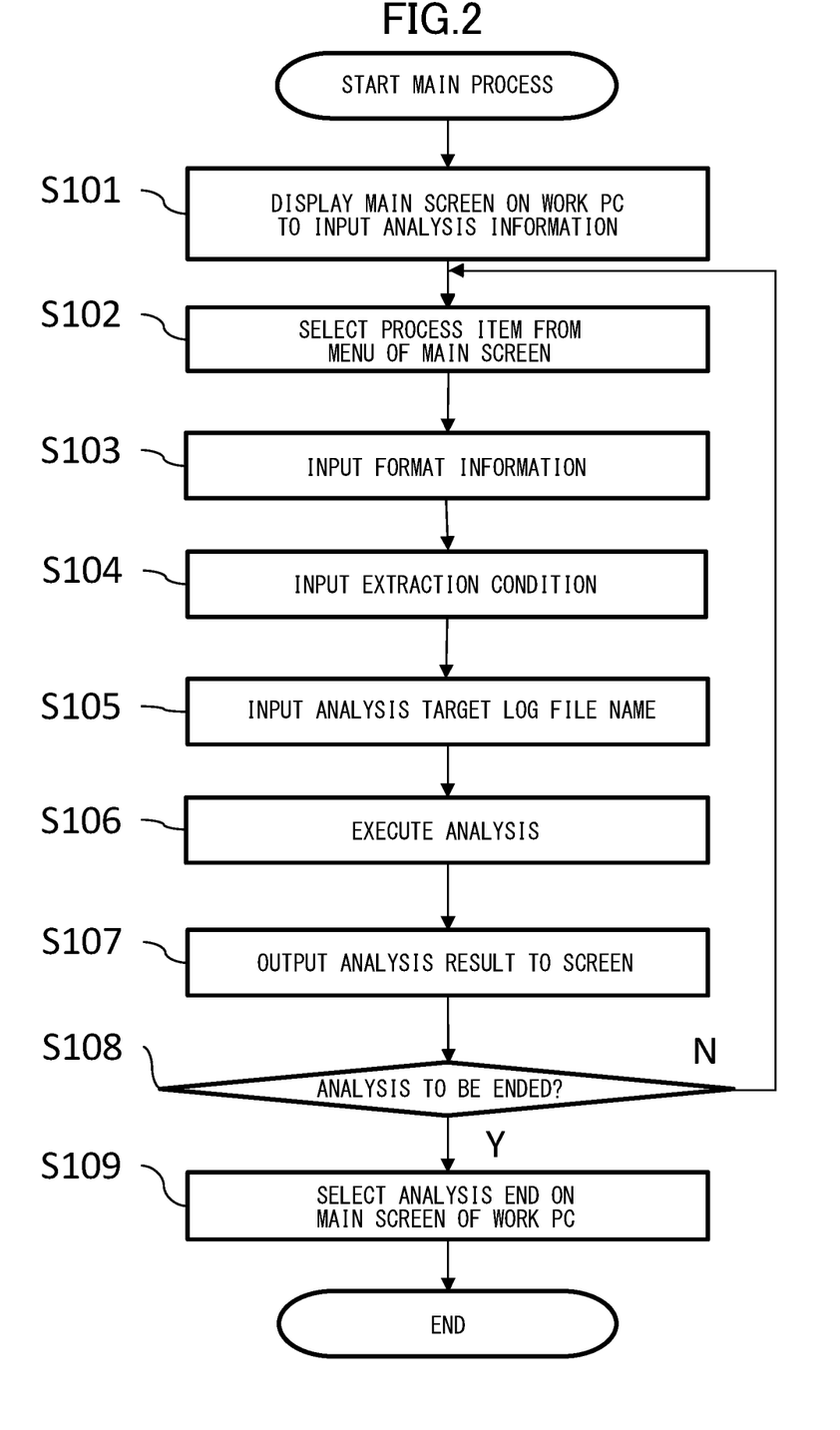
FIG. 2 is a flowchart illustrating a main process of an analysis operation of the first embodiment of the present invention.

FIG. 2 illustrates a flow of a main process in trouble analysis support of the present embodiment. In Step S101, an operator that conducts log analysis accesses the analysis server 2 via the work PC 3, and causes the input/output display portion 305 of the work PC 3 to display a main screen for inputting information for the analysis operation.

In Step S102, the operator selects an item corresponding to an operation that the operator desires to conduct in the log analysis, from an operation menu displayed on the main screen of the work PC 3. The operation menu is constituted by menu items corresponding to selectable processes, and contains "(a) input format", "(b) input extraction condition", "(c) select analysis target log", "(d) execute analysis", and "(e) end analysis". When any one of the above-described menu items (a), (b), (c), (d), and (e) is selected, the analysis server 2 executes a process corresponding to a selected menu item.

If the item "(a) input format" is selected from the menu of the main screen, then a format setting screen is displayed in Step S103 of FIG. 2. For example, the format setting screen is displayed on the display 1001 of the work PC 3 on which the user is working. The multiple-format-information inputting portion 301 of the work PC 3 sends information inputted via the format setting screen of the work PC 3, to the analysis server 2. The analysis server 2 receives the format information, and stores the format information in the multiple-format-information recording portion 203, as the log-format definition information 202. The format-information inputting process will be described later with reference to FIG. 3.

Note that the input of format information in Step S103 has only to be performed at least once before a log is extracted (searched). Alternatively, the input of format information may be performed immediately before the analysis operation is performed.

Figure 4:
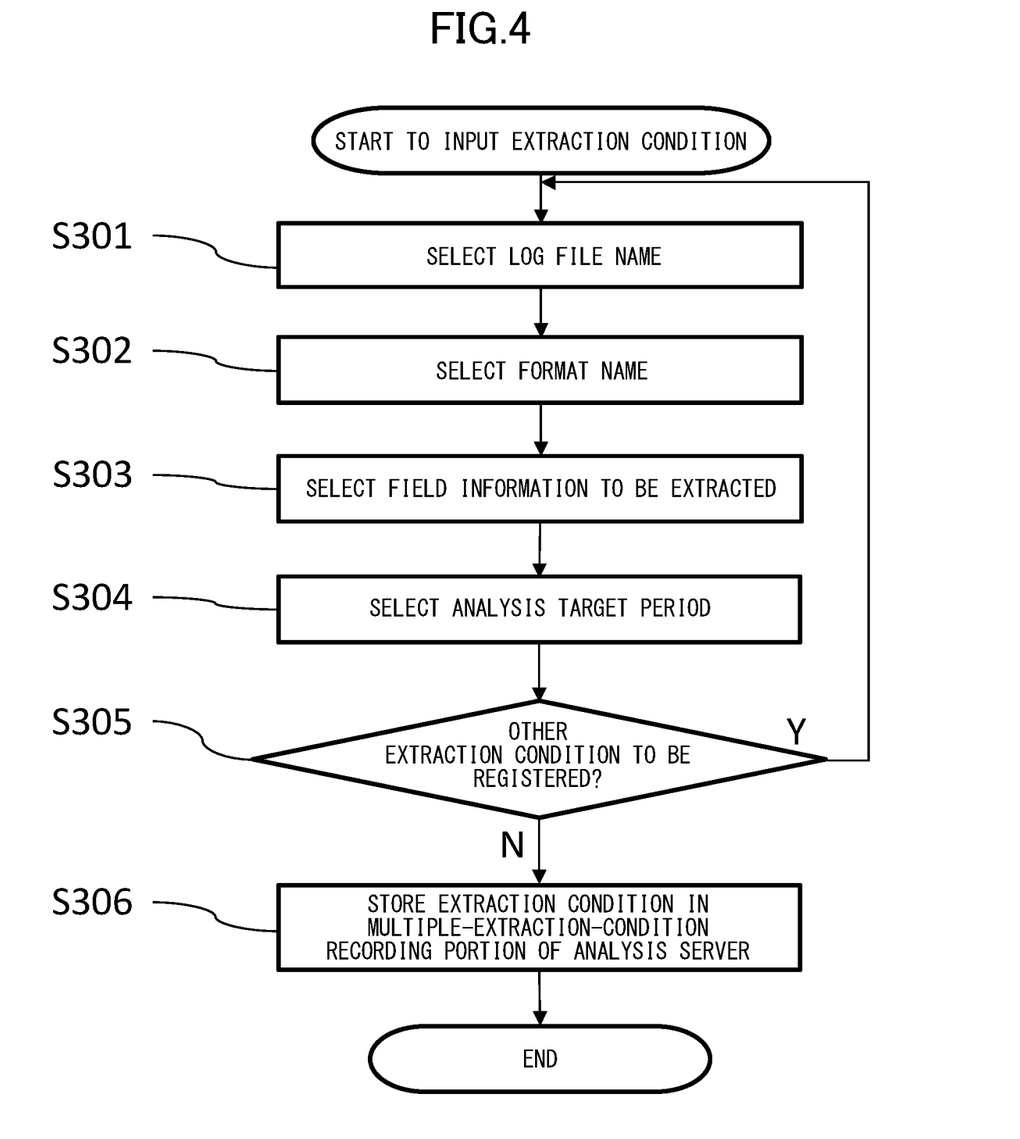
FIG. 4 is a flowchart illustrating an extraction-condition input process of the first embodiment of the present invention.

If the item "(b) input extraction condition" is selected from the menu of the main screen, then an extraction-condition setting screen is displayed in Step S104 of FIG. 2. For example, the extraction-condition setting screen is displayed on the display 1001 of the work PC 3 on which the user is working. The multiple-extraction-condition inputting portion 302 of the work PC 3 sends information inputted via the extraction-condition setting screen, to the analysis server 2. The analysis server 2 stores the extraction condition 204 in the multiple-extraction-condition recording portion 205 (FIG. 4 described later). Note that the input of extraction condition has only to be performed at least once before a log is extracted (searched). Alternatively, the input of extraction condition may be performed immediately before the analysis operation is performed.

Figure 5:
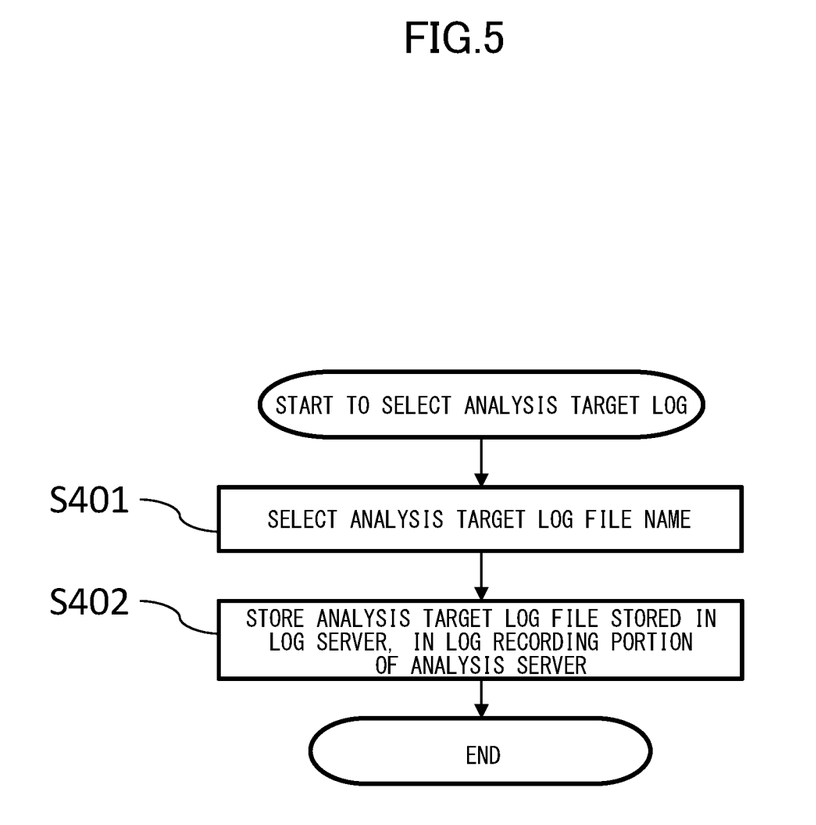
FIG. 5 is a flowchart illustrating an analysis-target-log selecting process of the first embodiment of the present invention.

If the item "(c) select analysis target log" is selected from the menu of the main screen, then an analysis-target-log selecting screen is displayed in Step S105 of FIG. 2. For example, the analysis-target-log selecting screen is displayed on the display 1001 of the work PC 3 on which the user is working. If a target log file is specified on the analysis-target-log selecting screen, then the analysis-target-log selecting portion 303 of the work PC 3 sends identification information of the log file to the analysis server 2. Accordingly, the analysis server 2 downloads the analysis-target log files (1011 to 1013) from the log server 1, and stores the analysis-target log files in the log recording portion 201 (FIG. 5 described later). The downloaded log files (1011 to 1013) may be stored in the log recording portion 201 in the order of download.

If the item "(d) execute analysis" is selected from the menu of the main screen, then the work PC 3 instructs the analysis server 2 to execute the analysis, in Step S106 of FIG. 2. If the analysis server 2 is instructed to execute the analysis, the analysis server 2 executes an extracting process (see FIG. 6 and the following figures described later) in accordance with the format information stored in the multiple-format-information recording portion 203 and the extraction condition information stored in the multiple-extraction-condition recording portion 205. Desired pieces of log data extracted from log data is stored in the extraction-result recording portion 206. The extracting process is performed on a group of log data downloaded from the log server 1 and stored in the log recording portion 201 in a state where a plurality of different formats is mixed.

In Step S107 of FIG. 2, extracted resultant data is read from the extraction-result recording portion 206 of the analysis server 2, and is displayed on the main screen or a subscreen of the display 1001 of the work PC 3.

In Step S108 of FIG. 2, it is determined whether the analysis operation on the work PC 3 is ended by a user. If the analysis is continued, then the process returns to Step S102 and repeats the above-described processes. If the analysis is to be ended, the user selects the item "(e) end analysis", in Step S109, from the menu on the main screen. With this operation, the analysis server 2 and the work PC 3 end the communication, and the analysis operation is ended. Note that any communication protocol can be used for the communication necessary for the analysis server 2 and the work PC 3 to cooperate with each other. As one example, the analysis server 2 may serve as an HTTP server or an HTTPS server that provides a Web page, in which a user interface including the above-described menu of the main screen is written; and the work PC 3 may access the WEB page.

Input of Format

Figure 3:
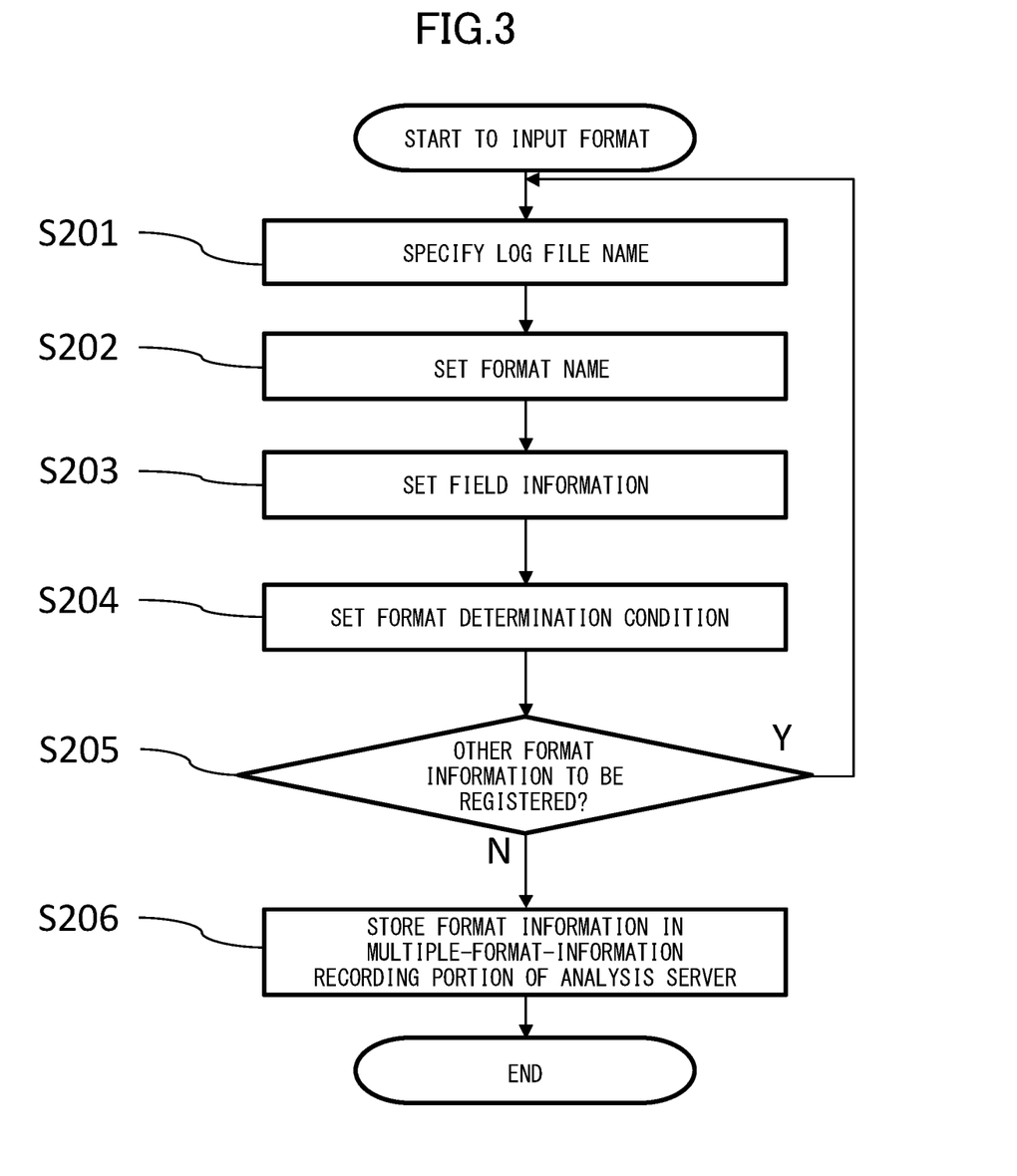
FIG. 3 is a flowchart illustrating a format-information input process of the first embodiment of the present invention.

FIG. 3 illustrates a flow of process performed by the multiple-format-information inputting portion 301. The process of FIG. 3 is executed when the item "input format" is selected on the main screen. In this process, the multiple-format information 202 is prepared. That is, the multiple-format information 202 inputted via the format inputting screen is stored in the multiple-format-information recording portion 203 of the analysis server 2. Note that the input of format information has only to be performed at least once before a log is extracted (searched). Alternatively, the input of format information may be performed immediately before the analysis operation is performed.

In Step S201 of FIG. 3, a log file name of a log file to be analyzed is inputted for registering the format information on the log file.

The log file name may be a full pathname (file name) of the log file, used by the log server 1. Alternatively, the log file name may be determined in a network-resource description format, such as a URL/URI format. If the URL/URI format is used, not only the log file name but also the type and format of the log file can be expressed.

In Step S202, a format name is registered for registering the format of the log. In the present embodiment, a plurality of formats can be defined for a single log file. Thus, a format name is registered for identifying each of the formats. In Step S203, field information on the log is registered for the name of the format registered in Step S202. The field information is represented by the names of pieces of log data, delimited by delimiters (spaces, TABs, commas, or the like).

Figure 7:
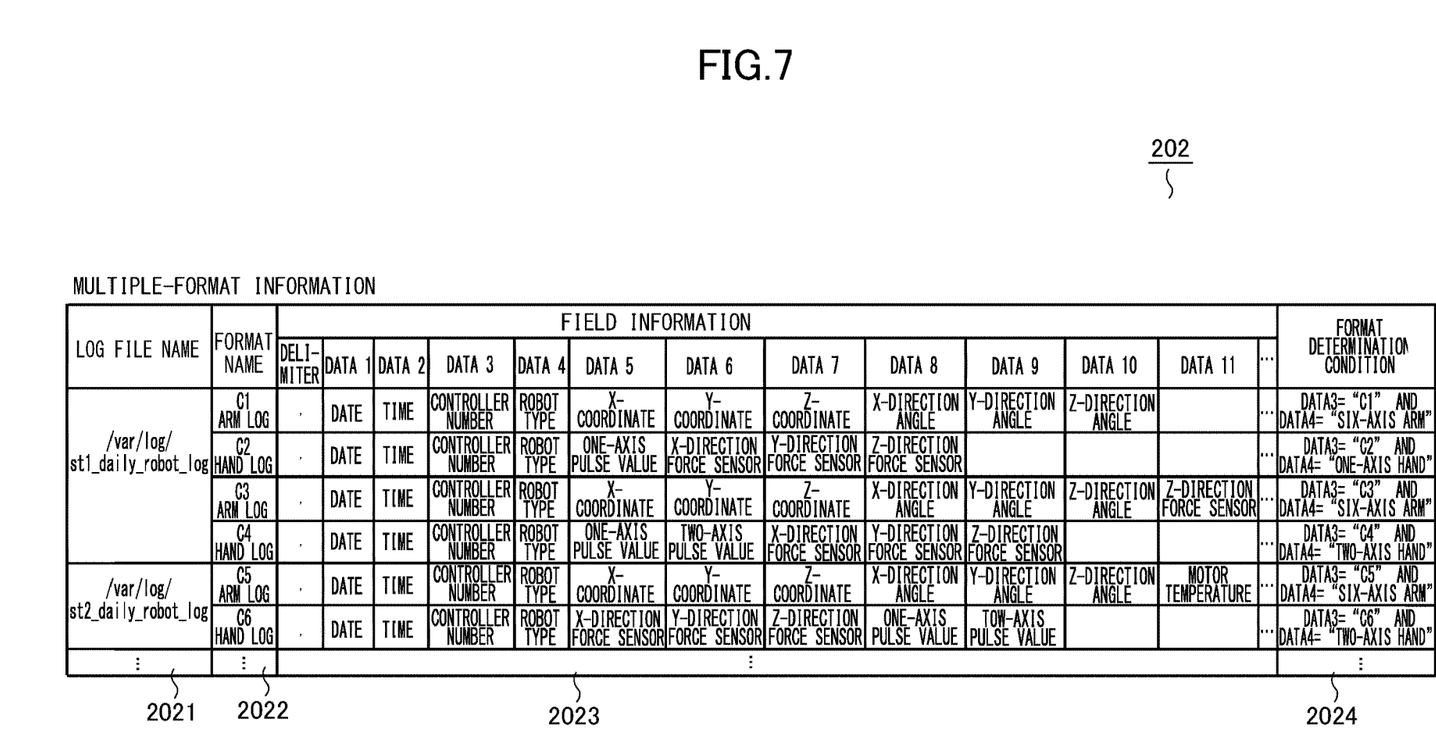
FIG. 7 is a diagram illustrating multiple-format information of the first embodiment of the present invention.

FIG. 7 illustrates the multiple-format information 202 to be stored in the multiple-format-information recording portion 203. In FIG. 7, a log file name 2021 in the multiple-format information 202 is, for example, a full pathname (file name) of a log file in the log server 1. In FIG. 7, a directory (folder) such as "/var/log/" of the log file name 2021 is a location to store a log, which is commonly used in the syslog system.

In addition, in FIG. 7, a field information 2023 includes items of "delimiter", "data 1", "data 2", . . . , and "data N". The items are pieces of definition information. In the example of the table of FIG. 7 that illustrates the field information, the data of the fields is delimited by predetermined delimiters (spaces, TABs, commas, or the like), and stored as log data. In addition, in FIG. 7, a format name 2022 in the multiple-format information is a log format name determined by using a mnemonic such as "C1 . . . ", "C2 . . . ", "C3 . . . ", or the like.

In addition, in FIG. 7, the item "data 1" of the field information 2023 represents date denoted by "date", and the item "data 2" represents time-stamp information denoted by "time". In general, the time stamp in log data is generated by an apparatus or a controller that generates the log data. In addition to this, another time stamp that indicates date and time at which log data is received by the log server 1 via a communication protocol, such as the syslog, may be added to the log data.

In this case, the time stamp at which log data is received by the log server 1 may be used as a sort key, and sort control may be performed by using the sort key. The sort control sorts extracted pieces of log data in the order of receipt, in which the log server 1 has received the log data. Such sort control can improve the viewability of log data in a case where a plurality of log files has been downloaded to the log recording portion 201. For performing the sort control that sorts extracted pieces of log data, the time stamp contained in the log data (i.e. "data 1" and "data 2" in FIG. 7) may be used as a sort key, as a matter of course. Note that not only the time stamp but also any item of the fields in the multiple-format information 202 may be used as a sort key. For example, identification information, such as the controller name or the format name, may be specified as a sort key. In addition, not only a single sort key but also two or more sort keys may be specified. In this case, the sort keys may be given the order of priority for the sort control.

In Step S204, a format determination condition 2024 (FIG. 7) is set to the format information inputted in the above-described steps S201, S202, and S203. Hereinafter, the format determination condition will be described.

In the present embodiment, a piece of log data is extracted from a single log file in which a plurality of pieces of log data having a plurality of formats is mixed. Thus, it is necessary to determine that the piece of log data contained in the log file has which format of the plurality of formats registered in the steps S201, S202, and S203. For this reason, a format determination condition to determine a corresponding format is set for each format name 2022.

For example, a format determination condition 2024 may be set by using the field information that is set in Step S203. The format determination condition 2024 is registered such that if a log, on which the format determination is performed, is delimited by commas, a format A is determined if the first data is a character string of "A", a format B is determined if the first data is a character string of "B", and so on.

In the example of FIG. 7, a format determination condition 2024 for a format name "C1 arm log" in the multiple-format information 202 is that the data 3 is "C1" and the data 4 is "six-axis robot". The data 3 and the data 4 are obtained by delimiting the log with commas.

In Step S205, it is determined whether another piece of format information is to be registered by a user. If there is the other piece of format information to be registered, the process returns to Step S201, and registers the other piece of format information by repeating the above-described operations. If there is no piece of format information to be registered, the process proceeds to Step S206. In Step S206, the multiple-format information 202 as illustrated in FIG. 7 and set in the steps S201 to S205 is stored in the multiple-format-information recording portion 203 of the analysis server 2.

Input of Extraction Condition

FIG. 4 illustrates a flow of the extraction-condition input process performed by the multiple-extraction-condition inputting portion 302 of the work PC 3. The process of FIG. 4 is executed when the item "(b) input extraction condition" is selected on the main screen. In this process, the information on the extraction condition is sent to the multiple-extraction-condition recording portion 205 of the analysis server 2, and registered as the multiple-extraction-condition information 204. Note that the input of extraction condition has only to be performed at least once before a log is extracted (searched). Alternatively, the input of extraction condition may be performed immediately before the analysis operation is performed.

In Step S301, an operator selects and inputs a log file name. A dialog box to input the log file name may be designed so that the log file name can be selected from among the log file names defined in the multiple-format information 202. The multiple-format information 202 is the information stored in the multiple-format-information recording portion 203 in the format-definition-information input process of FIG. 3. Alternatively, the log file name may be freely inputted by a user putting a character string in a text box.

In the example of FIG. 7, the multiple-format information 202 contains log file names of "st1_daily_robot_log" and "st2_daily_robot_log". In this case, either one of the log file names will be selected by a user, as a file name of a log to be extracted.

In Step S302, a format name is selected by an operator. The format name is selected from among the format names 2022 defined in the multiple-format information 202. The multiple-format information 202 is the information stored in the multiple-format-information recording portion 203 by the format inputting portion in the process of FIG. 3.

One example will be described by using the multiple-format information 202 illustrated in the table of FIG. 7. In FIG. 7, a log file name 2021 of "st1_daily_robot_log" has four format names defined as "C1 arm log", "C2 hand log", "C3 arm log", and "C4 hand log". If the log file name of "st1_daily_robot_log" is selected in the previously-described Step S301, either one of the four format names will be selected.

In Step S303, pieces of field information to be extracted are selected. The pieces of field information to be extracted are selected from the field information of the log data identified by using a log file name 2021 selected in Step S301 and a format name 2022 selected in Step S302. As an example, the description will be made for a case where a log file name of "st1_daily_robot_log" is selected in the multiple-format-information 202 of FIG. 7 in Step S301 and a format name of "C1 arm log" is selected in Step S302.

From the table of FIG. 7, pieces of the field information of the log file name 2021 of "st1_daily_robot_log" and the format name 2022 of "C1 arm log" are uniquely identified. The format "C1 arm log" includes pieces of the field information 2023 that are "date", "time", "controller number", "robot type", and "command type", delimited by commas. In addition, the format "C1 arm log" also includes pieces of the field information 2023 that are "X-coordinate", "Y-coordinate", "Z-coordinate", "X-direction angle", "Y-direction angle", and "Z-direction angle". Thus, the number of the pieces of the field information 2023 are eleven in total. A user selects desired items whose data will be extracted in the log analysis, from the eleven pieces of the field data. If the user desires to extract eight pieces of data, "date", "time", "controller number", "robot type", "command type", "X-coordinate", "Y-coordinate", and "Z-coordinate", the user will select the eight items. Note that if the time stamp, "date" and "time", is to be specified, a user interface as illustrated in FIG. 8 and intended to specify an analysis target period of day and time is preferably provided.

Figure 8:
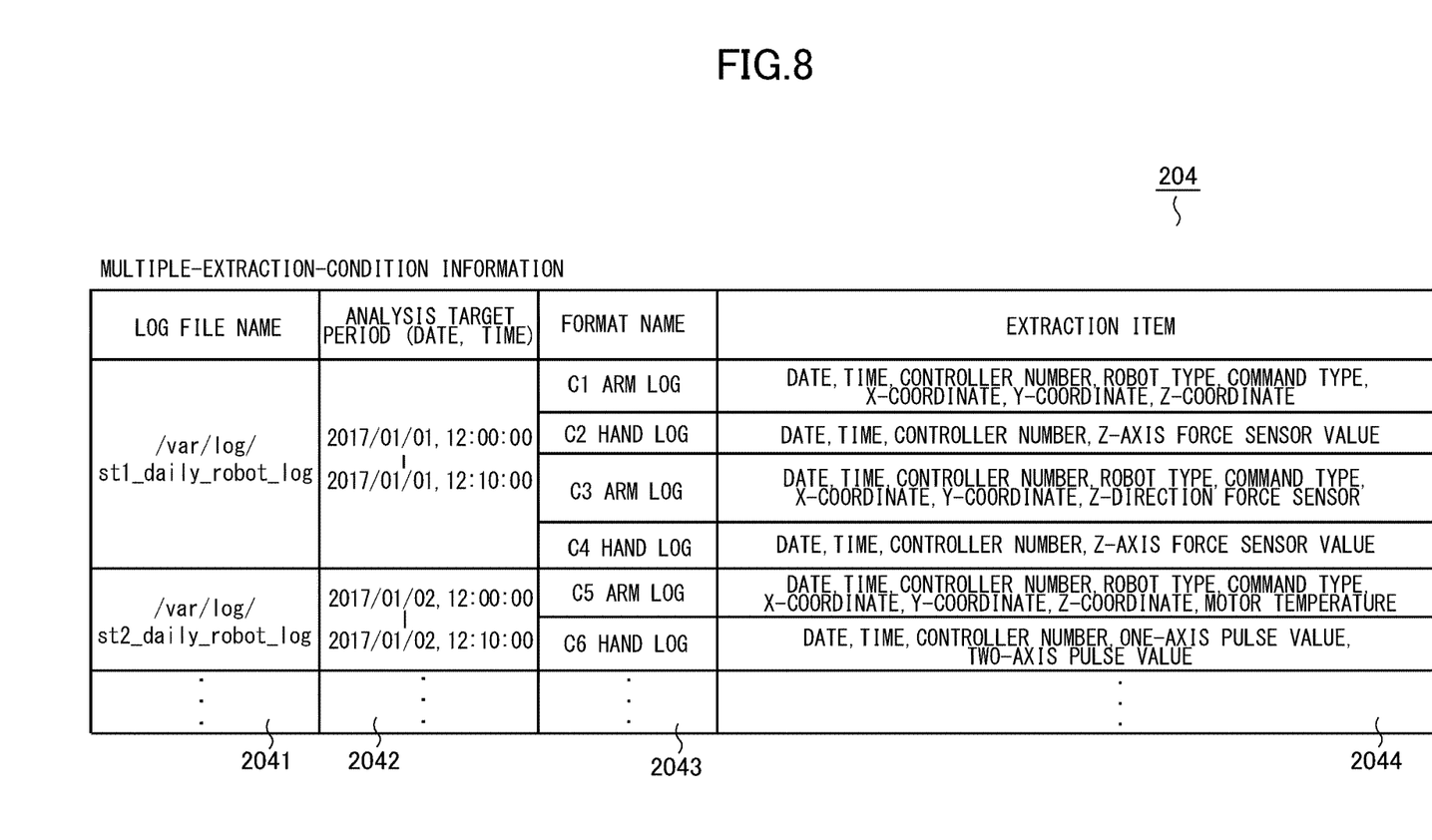
FIG. 8 is a diagram illustrating multiple-extraction-condition information of the first embodiment of the present invention.

As the result of this selection, the multiple-extraction-condition information 204 to be stored in the multiple-extraction-condition recording portion 205 of the analysis server 2 is created as illustrated in FIG. 8. The multiple-extraction-condition information 204 of FIG. 8 contains items of the log file name 2041, the analysis target period 2042, the format name 2043, and the extraction item 2044.

In Step S304, the analysis target period is specified. The analysis target period is a range of day and time, and a log file in the range of day and time will be analyzed. In the example of the multiple-extraction-condition information 204 illustrated in FIG. 8, the analysis target period 2042 is specified in the format of "date, time" of log. In this example, pieces of log data in ten minutes from 2017 Jan. 1 12:00:00 to 2017 Jan. 1 12:10:00 will be extracted. Note that if the time stamp that indicates a log-data acquisition time acquired by the log server 1 is contained in the log data, pieces of the log data can be extracted in the same manner by referring to the log-data acquisition time.

In Step S305 of FIG. 4, the user determines whether to input another extraction condition. If there is the other extraction condition to be inputted, then the process returns to Step S301, and causes the user to input an extraction condition again by performing the above-described operations. If there is no more extraction condition to be inputted, the process proceeds to Step S306. In Step S306, the multiple-extraction-condition information 204 as illustrated in FIG. 8 and inputted in the steps S301 to S305 is sent to the analysis server 2. The analysis server 2 receives the multiple-extraction-condition information 204, and stores the multiple-extraction-condition information 204 in the multiple-extraction-condition recording portion 205.

Selection of Target Analysis Log

FIG. 5 illustrates a flow of the selecting process performed by the analysis-target-log selecting portion 303 of the work PC 3. The selecting process is executed when the item "select analysis target log" is selected on the main screen. Specifically, an operator (user) selects a log file to be analyzed, and the selected log file is stored in the log recording portion 201 of the analysis server 2.

In Step S401, the operator selects a log file name of a log file to be analyzed. The log file name is selected from among the log file names defined in the multiple-format information 202. The multiple-format information 202 is the information stored in the multiple-format-information recording portion 203 in the process performed by the format inputting portion. In the example of FIG. 7, since the log file names of "st1_daily_robot_log" and "st2_daily_robot_log" are defined in the multiple-format information 202, the log file name is selected from among these log file names.

In Step S402, the log file name of an analysis-target log file selected by the user in Step S401 is sent to the analysis server 2. Accordingly, the analysis server 2 receives the log file name; downloads the analysis-target log file having the log file name, from the log server 1; and stores the analysis-target log file in the log recording portion 201.

Execution of Analysis

The analysis process is executed by the analysis-process-execution instructing portion 304 of the work PC 3 when the item "(d) analyze" is selected on the main screen. When the item "(d) analyze" is selected in this manner, the work PC 3 instructs the analysis server 2 to execute the log analysis. The analysis server 2 receives the analysis execution instruction, and executes the log analysis process as described below.

Log Analysis Process

Figure 6:
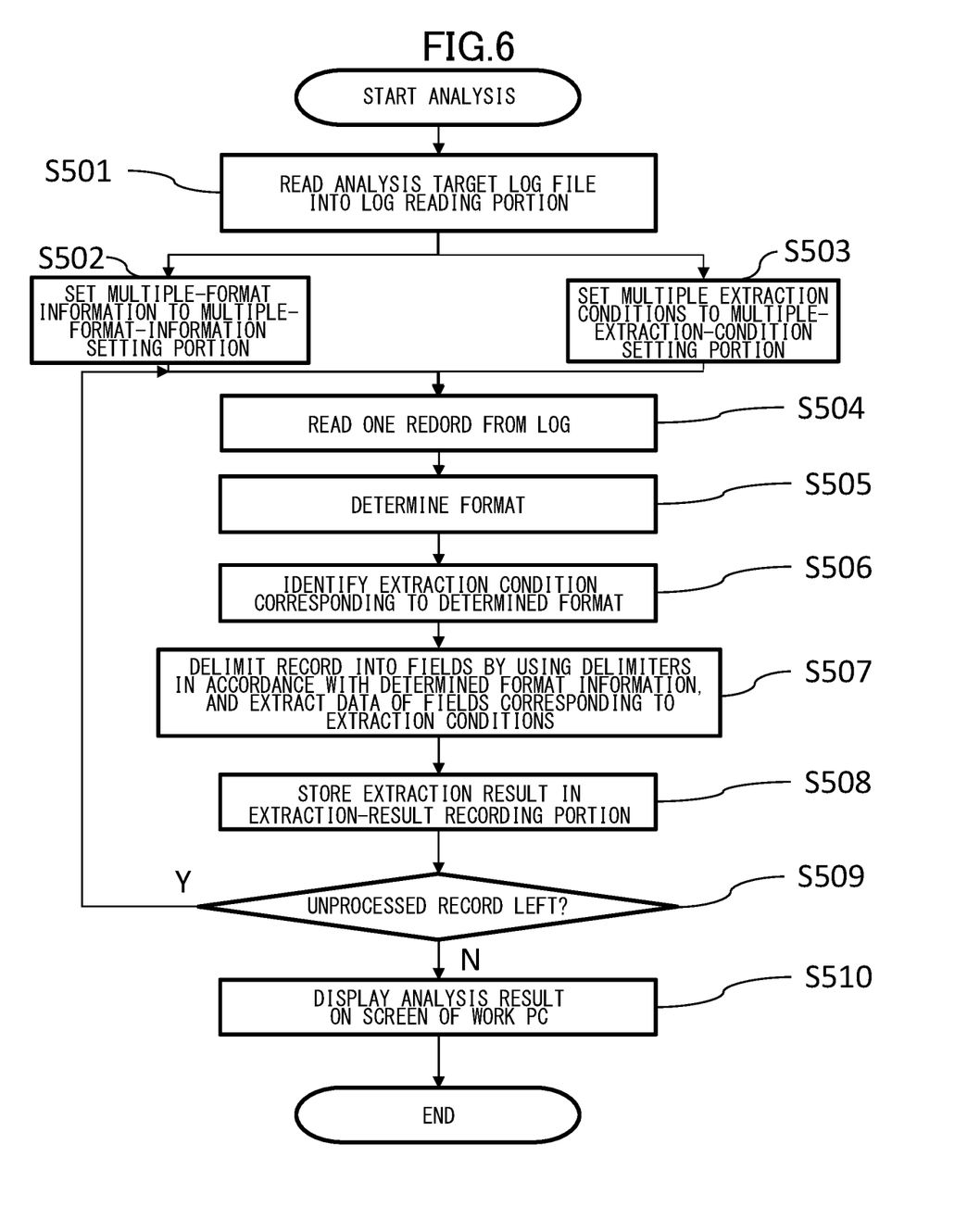
FIG. 6 is a flowchart illustrating a log analysis process of the first embodiment of the present invention.

FIG. 6 illustrates a flow of the analysis process that extracts pieces of log data having different formats and stored in the log recording portion 201, depending on the information stored in the multiple-format-information recording portion (format-information recording portion) 203 and the information stored in the multiple-extraction-condition recording portion (extraction-condition recording portion) 205. The multiple-format-information recording portion (format-information recording portion) 203 stores the information on the recording formats of log data, and the multiple-extraction-condition recording portion (extraction-condition recording portion) 205 stores the information on extraction conditions specified by a user. The log extracted depending on the two types of information is stored in the extraction-result recording portion 206.

In Step S501 of FIG. 6, log data is read from the log recording portion 201 of the analysis server 2, into the log reading portion 207. In Step S502, the multiple-format information 202 corresponding to the log file name of a log file to be analyzed is read from the multiple-format-information recording portion 203 into the multiple-format-information setting portion 208.

For example, in the example of the multiple-format information 202 illustrated in FIG. 7, if the log file name of a log file to be analyzed is "st1_daily_robot_log", the format information corresponding to the log file name is read and set in the multiple-format information setting portion 208.

In Step S503, the log file name of a log file to be analyzed and multiple extraction conditions corresponding to each format of the log file are read from the multiple-extraction-condition recording portion 205 and set in the multiple-format-information setting portion 210. For example, in the example of the multiple-extraction-condition information 204 illustrated in FIG. 8, suppose that the log file name of a log file to be analyzed is "st1_daily_robot_log". In this case, extraction conditions corresponding to the log file name are read from the table of the multiple-extraction-condition information 204 of FIG. 8, and set in the multiple-extraction-condition setting portion 210.

In Step S504, one record is read in a sequential manner from the top of the log data stored in the log reading portion 207 in Step S501. In the present embodiment, the pieces of log data of a log file to be analyzed are recorded such that one record forms one line.

In Step S505, the format determination process is performed on the one record that is read by the format determining portion 209 in Step S504, depending on the information that is set in the multiple-format-information setting portion 208 in Step S502.

Figure 9:
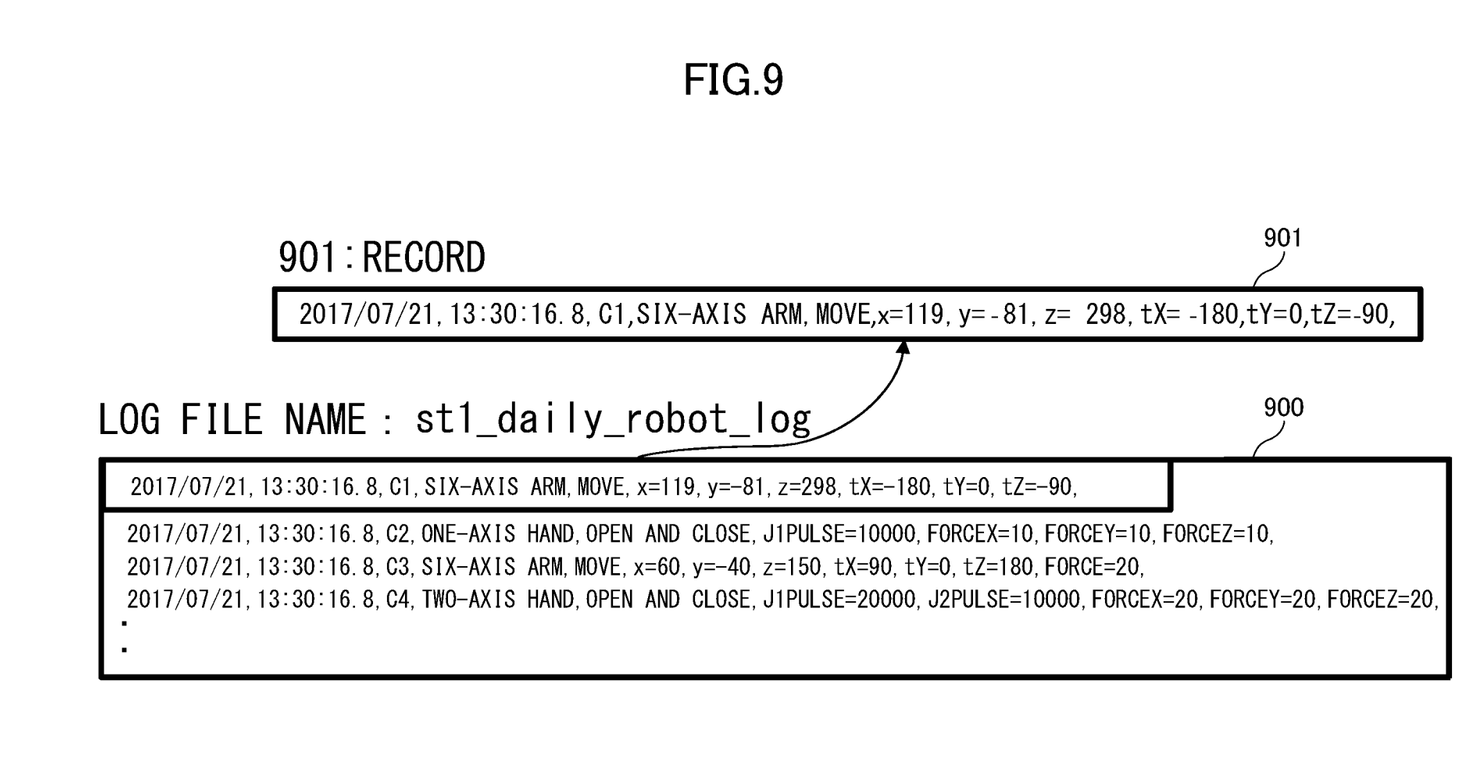
FIG. 9 is a diagram illustrating a record of a log used in the analysis process of the first embodiment of the present invention.

As an example, in the multiple-format information 202 of FIG. 7, suppose that the log file name of a log file to be analyzed is "st1_daily_robot_log" and a record having been read in Step S504 is a record 901 illustrated in FIG. 9. In this case, it is determined that the record 901 having been read has which format in the multiple-format information 202 of FIG. 7.

In the multiple-format information 202 of FIG. 7, four formats of "C1 arm log" to "C4 hand log" are defined. In this example, the determination is performed in the order from "C1 arm log" to "C4 hand log". If the format "C1 arm log" is delimited by commas, the one record of the log data of FIG. 9, which has been read, is delimited by commas into fields. After the one record is delimited into fields, the format determination condition for the format "C1 arm log" is checked. In this case, the determination condition for the format "C1 arm log" is that the data 3 is "C1" and the data 4 is "six-axis arm". When the record is delimited by commas, the third field is the data 3 and the fourth field is the data 4. Thus, values of the data 3 and the data 4 are checked.

For example, in the record 901 illustrated in FIG. 9, the data 3 is "C1" and the data 4 is "six-axis arm". Thus, the record 901 satisfies the determination condition for the "C1 arm log" illustrated in FIG. 7. Consequently, the format of the record 901 of the log data is determined as the format "C1 arm log".

In Step S506, log extraction conditions corresponding to the format determined in Step S505 are identified. The extraction conditions are identified from among the extraction conditions that are set in the multiple-extraction-condition setting portion 210 in Step S503. For example, in the example of the multiple-extraction-condition information 204 of FIG. 8, suppose that the format determined in Step S505 is the format "C1 arm log".

In a line of the multiple-extraction-condition information 204 of FIG. 8 corresponding to the format "C1 arm log", eight extraction items of "date", "time", "controller number", "robot type", "command type", "X-coordinate", "Y-coordinate", and "Z-coordinate" are included as extraction conditions. In addition, the multiple-extraction-condition information 204 of FIG. 8 contains analysis-target period information that is set for each log file to be analyzed. Thus, the above-described eight extraction items and the analysis-target period information are extraction conditions for the format "C1 arm log".

In Step S507, the log extracting process is performed by using the format information determined in Step S505 and the extraction conditions identified in Step S506. In the example of the multiple-format information 202 of FIG. 7 and the multiple-extraction-condition information 204 of FIG. 8, the one record that is read in Step S504 is the record 901 of FIG. 9, and the format of the record 901 is the format "C1 arm log". The format information and the extraction conditions of the record 901 have already been identified in the steps S505 and S506. Thus, the record 901 is delimited by commas into fields, in accordance with the format information of the format "C1 arm log"; and pieces of delimited data are stored as "data 1", . . . , and "data 10". The information on each field is identified by using the determined format information. For example, the data 1 represents date, the data 2 represents time, and so on.

Then, only necessary items are extracted, depending on the extraction conditions for the format "C1 arm log". As described above, in FIG. 8, the extraction conditions for the format "C1 arm log" are "date", "time", "controller number", "robot type", "command type", "X-coordinate", "Y-coordinate", and "Z-coordinate". Since the data 1 of the record 901 is "date", the data 1 is an extraction item. Thus, the field of the record 901 corresponding to the data 1 is extracted. In addition, since the data 2 is "time", it is determined that the field corresponding to the data 2 is also a field to be extracted. Similarly, it is also determined whether fields corresponding to the data 3 to 10 are to be extracted.

In this example, eight pieces of data of the data 1, 2, 3, 4, 5, 6, 7, and 8 are determined as extraction items, and the eight pieces of data are extracted from the record 901.

In Step S508, the extracted resultant data obtained in Step S507 is stored in the extraction-result recording portion 206 of the analysis server 2. In Step S509, it is determined whether another record to be analyzed is left. In this determination, it is determined whether a line of unprocessed log data is left in the log reading portion 207, for example.

In Step S504, one record is read in a sequential manner from the top of the log data stored in the log reading portion 207 in the above-described Step S501, and then is analyzed. If there is a next record in Step S509, the process returns to Step S504 and analyzes the next record. If there is no unprocessed record of log data in the determination for the presence of next record, the process determines that all the records have been processed, and proceeds to a later-described step S510.

In Step S510, the extracted resultant data obtained through the processes in the steps S501 to S509 and stored in Step S508 in the extraction-result recording portion 206 of the analysis server 2 is outputted to the display 1001 of the work PC 3. FIG. 10 illustrates the extracted resultant data displayed on the screen of the display 1001 of the work PC 3. In this manner, the analysis process is executed, and only items required for analysis are extracted. The extracted resultant data is sent from the analysis server 2 to the work PC 3, and displayed on the analysis-result display screen of the display 1001 of the work PC 3, as illustrated in FIG. 10. Thus, an operator can identify a cause of trouble by watching the analysis-result display screen displayed on the display 1001. A log on which the extraction is performed contains many pieces of information unnecessary for trouble analysis. In the extracting process of the present embodiment, however, an operator can select any items that the operator desires to check, and extract only necessary items. Note that the information outputted to the analysis-result display screen may be saved into a file in the CSV format or the like.

As described above, in the present embodiment, a log format can be determined by the format determining portion 209 by using the multiple-format information 202 and the multiple-extraction-condition information 204 stored in the analysis server 2. Thus, even for a log file in which a plurality of recording formats different from each other is mixed, items necessary for analysis can be specified for each of the different formats, and desired pieces of log data can be extracted. Note that an output format in which the extracted pieces of log data are outputted may be any format desired and selected by a user. Thus, the output format in which the extracted pieces of log data are outputted may not necessarily be the same as a format in which the pieces of log data to be extracted are recorded.

The extracted resultant data can be displayed on the display 1001, as illustrated in FIG. 10 as an example. Thus, an operator (user) can view the log data extracted from a log file in accordance with specified extraction conditions, logged in a desired period of time, and related to a desired device or a member of the device. With the operation, any trouble analysis for a production apparatus can be efficiently performed in short time. Since only the items necessary for trouble analysis of a robot production apparatus are extracted and displayed on the display 1001, a user (operator) that performs the trouble analysis does not have to manually perform extracting or editing operation on a log.

The present embodiment can reduce labor and time in trouble analysis for a production apparatus, in particular, in a log analysis operation that involves reading a log and extracting log data. In addition, for the above-described log analysis operation that involves extracting log data, the need for expertise conventionally required for users can be eliminated. Thus, any user who has no expertise and less experience can easily and efficiently perform the log analysis.

Note that in a configuration including a sort control portion that sorts (rearranges) extracted pieces of log data by using a desired sort key, a user (operator) can view the pieces of log data in a state where the pieces of log data have been sorted in a desired order. With this operation, the readability for the log data increases significantly. In this case, an item (data) of any field can be specified as a sort key, if the item is included in the log data. For example, if a field representing time acquired by the log server 1 is contained in the log data, the analysis server 1 can sort the extracted pieces of log data by using the time (the order in transmission) as a sort key. Since the pieces of log data are sorted by using the time acquired by the log server 1, the extracted pieces of log data can be rearranged in the order that an operator can easily handle, in particular in a case where the pieces of log data are extracted from a file into which a plurality of log files (1011 to 1013 in FIG. 1) are merged. As a result, the viewability and the readability for the log data increase significantly.

As described above, the extracted pieces of log data are displayed on the display so that a user can analyze the extracted pieces of log data. In addition to this, a control unit, such as a CPU, may monitor the extracted pieces of log data for detecting an error of the extracted pieces of log data. In this case, every time the log server 1 acquires a log, the analysis server 2 may extract log data in real time, and the control unit may monitor numerical values of predetermined fields of the extracted log data. If an error of the numerical values of the predetermined fields of the extracted log data is detected, an alarm may be issued by a display or a voice output unit, or an emergency stop signal may be sent to a controller of a production apparatus. In addition, although the description has been made as an example for the case where the display is used as an output unit that outputs extracted log data, any output unit, such as a printing unit (e.g. printer) or a voice output unit (e.g. speaker), may be used as an output unit that outputs extracted log data.

The present invention can also be achieved by providing a program, which performs one or more functions of the above-described embodiment, to a system or a device via a network or a storage medium, and by one or more processors, which are included in the system or the device, reading and executing the program. In addition, the present invention can also be achieved by using a circuit, such as an ASIC, which performs one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-229476, filed Dec. 19, 2019, which is hereby incorporated by reference herein in its entirety.

What is claimed is:

1. An information processing system that extracts specified pieces of log data or specified fields that constitutes the specified pieces of log data, from a log file in which pieces of log data having different recording formats are mixed, the information processing system comprising:
   a format-information recording portion configured to store format information in which determination conditions to identify recording formats of the specified pieces of log data is are contained;
   an extraction-condition recording portion configured to store aft extraction conditions to extract the specified pieces of log data or the specified fields that constitute the specified pieces of log data;
   an extraction processing portion configured to extract the specified pieces of log data having different recording formats or the specified fields that constitute the specified pieces of log data having different recording formats, from the log file by using the format information stored in the format-information recording portion and the extraction condition stored in the extraction-condition recording portion; and
   an extraction-result recording portion configured to store the specified pieces of log data having different recording formats or the specified fields that constitute the specified pieces of log data having different recording formats,
   wherein the extraction-result recording portion is configured to output extract resultant data in such a manner that the specified pieces of log data having different recording formats are displayed on a screen at the same time or the specified fields that constitute the specified pieces of log data having different recording formats are displayed on the screen at the same time.

2. The information processing system according to claim 1, wherein the log file comprises pieces of log data generated from a plurality of apparatuses and having different recording formats.

3. The information processing system according to claim 2, wherein the pieces of log data having different recording formats are transmitted via a predetermined communication protocol, and recorded in the log file in an order in transmission.

4. The information processing system according to claim 2, wherein the pieces of log data having different recording formats are transmitted via a network, and recorded in the log file.

5. The information processing system according to claim 2, wherein the plurality of apparatuses are made by different makers or vendors.

6. The information processing system according to claim 1, further comprising an output portion including the screen and configured to output the specified pieces of log data extracted by the extraction processing portion or the specified fields that constitute the specified pieces of log data.

7. The information processing system according to claim 1, further comprising a sort control portion configured to sort, by using a sort key, the specified pieces of log data extracted by the extraction processing portion or the specified fields that constitute the specified pieces of log data.

8. The information processing system according to claim 7, wherein the sort key is time information at which each piece of the log data to be recorded in the log file is received via a predetermined communication protocol, or time information included in a time stamp that is included in each piece of the log data.

9. The information processing system according to claim 1, further comprising a work terminal that comprises a user interface configured to set the format information and/or the extraction condition.

10. The information processing system according to claim 9, wherein the work terminal comprises an output portion including the screen and configured to output the specified piece of log data extracted by the extraction processing portion or the specified field that constitutes the specified piece of log data.

11. The information processing system according to claim 10, wherein an output format in which a specified field is outputted is different from a format in which a specified piece of log data or the specified field is recorded.

12. The information processing system according to claim 9, wherein the log file comprises the pieces of log data generated from a plurality of production apparatuses and having different recording formats.

13. The information processing system according to claim 12, wherein the plurality of production apparatuses comprises a robot and/or a robot hand.

14. The information processing system according to claim 1, wherein the extraction-result recording portion is configured to output extract resultant data in such a manner that the specified pieces of log data having different recording formats are displayed on the screen at the same time with time information at which each piece of the log data to be recorded in the log file or time information included in a time stamp that is included in each piece of the log data, or the specified fields that constitute the specified pieces of log data having different recording formats are displayed on the screen at the same time with the time information at which each piece of the log data to be recorded in the log file or the time information included in the time stamp that is included in each piece of the log data.

15. An information processing method that extracts specified pieces of log data or specified fields that constitute the specified pieces of log data, from a log file in which pieces of log data having different recording formats are mixed, the information processing method comprising:
   preparing, by a control device, format information in which determination conditions to identify recording formats of the specified pieces of log data are contained;
   preparing, by the control device, an extraction condition to extract the specified pieces of log data or the specified fields that constitute the specified pieces of log data;
   extracting, by the control device, the specified pieces of log data having different recording formats or the fields that constitute the specified pieces of log data having different recording formats, from the log file by using the format information and the extraction condition; and
   outputting, by the control device, extract resultant data in such a manner that the specified pieces of log data having different recording formats are displayed on a screen at the same time or the specified fields that constitute the specified pieces of log data having different recording formats are displayed on the screen at the same time.

16. A non-transitory machine readable storage medium storing a program that causes a computer to perform the information processing method according to claim 15.

* * * * *